United States Patent [19]
Matuschek et al.

[11] Patent Number: 6,072,146
[45] Date of Patent: Jun. 6, 2000

[54] RESISTANCE WELDING GUN WITH ON-BOARD MEMORY

[75] Inventors: Ulrich Matuschek; Norbert Metzen; Karl Pöll, all of Aachen, Germany

[73] Assignee: Matuschek Messtechnik GmbH, Herzogenrath, Germany

[21] Appl. No.: 09/113,829

[22] Filed: Jul. 10, 1998

[30] Foreign Application Priority Data

Mar. 31, 1998 [DE] Germany .......................... 198 14 249

[51] Int. Cl.⁷ .................................................. B23K 11/24
[52] U.S. Cl. ........................... 219/110; 219/86.8; 219/90; 483/9; 700/212
[58] Field of Search ........................... 219/86.8, 90, 91.1, 219/110; 364/477.06; 483/9; 700/212

[56] References Cited

U.S. PATENT DOCUMENTS

| | | | |
|---|---|---|---|
| 4,415,792 | 11/1983 | Jordan ........................................ | 219/98 |
| 4,571,488 | 2/1986 | Reeves ..................................... | 219/544 |
| 4,588,339 | 5/1986 | Bilz . | |
| 4,742,470 | 5/1988 | Juengel ..................................... | 483/9 |
| 4,809,426 | 3/1989 | Takeuchi et al. ......................... | 365/64 |
| 5,248,867 | 9/1993 | Ohba et al. ........................... | 219/69.15 |
| 5,357,076 | 10/1994 | Blankenship ....................... | 219/121.54 |

FOREIGN PATENT DOCUMENTS

| | | |
|---|---|---|
| 2464781 | 4/1981 | France ..................................... 219/90 |
| 38 33 072 A1 | 9/1888 | Germany . |
| 19 63 874 | 7/1967 | Germany . |
| 33 26 615 | 7/1983 | Germany . |
| 36 39 578 C2 | 11/1986 | Germany . |
| 3824734 A1 | 7/1988 | Germany . |
| 43 06 492 C1 | 3/1993 | Germany . |

*Primary Examiner*—Geoffrey S. Evans
*Attorney, Agent, or Firm*—Hutchins, Wheeler & Dittmar

[57] ABSTRACT

A resistance welding device having a welding current source, a control and/or regulating device for regulating the welding current, and at least one set of interchangeable welding guns on which welding electrodes are mounted in such fashion that they can be pressed toward one another to hold sheets to be welded between them. The interchangeable welding guns contain a local data storage memory located on the welding guns for storing data specific to the operation of the welding guns, and a data interface which can interact with a second data interface located on the control and/or regulating device. When the set of welding guns in attached to the welding device, the two data interfaces are connected thereby permitting the specific operating data for the welding guns to be transmitted to the program memory of control and/or regulating device. The invention also includes self-programming welding guns capable of automatically programming a control and/or regulating device with the operating parameters necessary to optimally operate the set of welding guns.

19 Claims, 1 Drawing Sheet

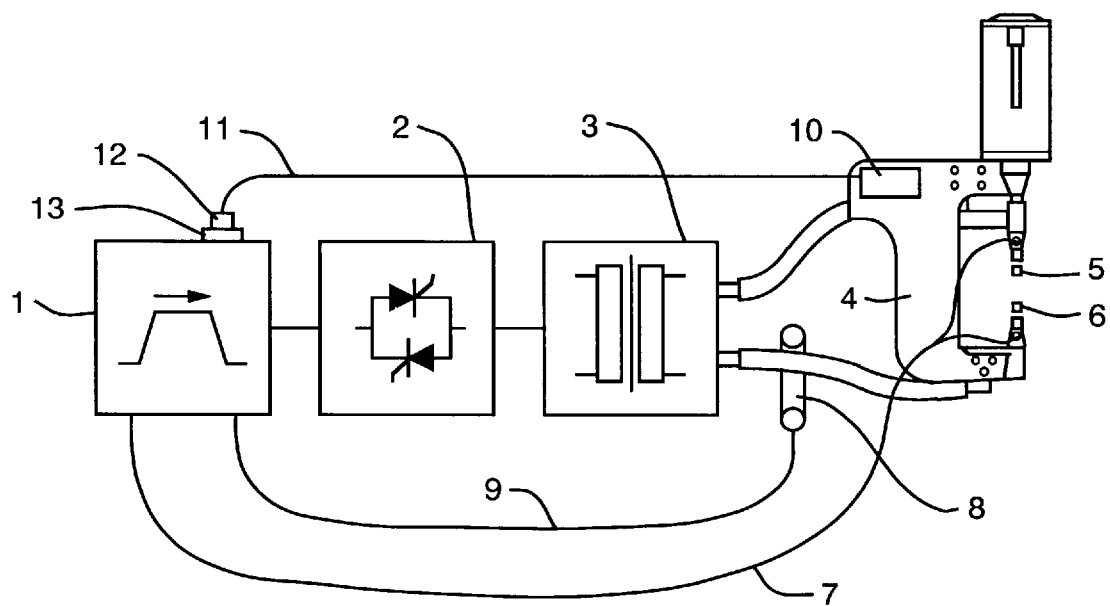

6,072,146

RESISTANCE WELDING GUN WITH ON-BOARD MEMORY

FIELD OF THE INVENTION

The invention relates to a resistance welding device with a welding current source, a control and/or regulating device for the welding current, and at least one pair of replaceable self-programming welding guns attached to the welding elements in such fashion that the welding electrodes can be pressed toward one another to hold sheets to be welded between them.

BACKGROUND OF THE INVENTION

Resistance welding devices are used for welding various components, and in particular, for spot welding in body construction. Typically, two or more sheets to be welded together are brought into contact with each other and the welding electrodes are pressed against the surfaces of these sheets by the welding guns. The welding current melts the contact zone between these sheets to create a spot weld.

The curve of the welding current must be controlled and/or regulated within narrow limits so that the spot weld has the necessary quality and the sheets to be welded are joined properly and without the occurrence of spatter.

Various methods can be used for optimum regulation of the welding current curve. In a static control method, the welding time, strength of the welding current, and the force of the electrode pressure are fixed. More complex and expensive dynamic regulating methods utilize reference curves of the dynamic welding current and of the dynamic electrode voltage drop. In these methods, during welding, measuring devices continuously measure the dynamic welding current and the electrode voltage. If any deviations from the reference curve occur, the control and/or regulating devices adjust the welding current source so that the measured current and voltage curves match the specified reference curve as closely as possible. Alternatively, other physical parameters may be used for welding regulation, for example ultrasonic signals conducted into the weld or noise signals produced by the welding process, electrode force, electrode movement, thermovoltages, power, resistance, and energy.

In all known control and/or regulating methods, the control and/or regulating parameters (also referred to herein as the reference data sets) depend upon the welding guns used in each case. Depending on the size of the guns, the pressure generated by the guns, and the various shapes of the welding electrodes in the guns, these control and/or regulating parameters may change markedly.

In an industrial manufacturing device, a large number of welding guns may be used. Frequently, 250 or more welding guns will be connected via quick-change couplings to the various welding current sources. In order for the welding performed with a given set of welding guns to proceed optimally, the data set with the specific control and regulating parameters associated with those welding guns must be loaded into the program memory of the control and/or regulating device of the welding device every time the guns are changed. The control and regulating parameters are then stored in a central memory integrated either into the control and/or regulating device, or in the case of several welding stations, within a manufacturing system, connected by a data network with the various control and/or regulating devices. The persons operating the welding devices must be careful to be sure that the control and regulating data sets corresponding to the welding guns being used are properly loaded before welding.

SUMMARY OF THE INVENTION

It is an object of the present invention is to simplify the data management operation and to increase the reliability of a resistance welding device. This goal may be achieved according to the invention by incorporating into a welding device, such as a welding guns, a local memory for storing the data sets specific to the welding guns, and a data interface capable of being connected with a data interface of the control and/or regulating device. When the welding guns are connected to the welding device, the data sets unique to the set of welding guns can be transmitted through its data interface to the program memory of the control and/or regulating device.

In one aspect, the present invention comprises a resistance welding device comprising a welding current source, a control or regulating device for regulating the welding current, and at least one set of replaceable welding guns, wherein said set of welding guns comprises a local data storage memory for storing data specific for the welding guns and a first data interface for transmitting said data to the control or regulating device.

In another aspect, the invention comprises a set of self-programming welding guns comprising a local data storage memory for storing data specific for the welding guns and a first data interface for transmitting said data to a control or regulating device which controls operation of the welding guns. The self-programming welding guns are thus capable of automatically programming a control and/or regulating device with the operating parameters necessary to optimally operate the set of welding guns.

Local storage of the specific control and regulating parameters for the welding guns, and possibly of other relevant data as well, offers significant advantages in operating a resistance welding device and in managing the data required for controlling and regulating the welding current. When the set of welding guns containing its own operating parameters is connected to the welding current source, and the data sets stored in the local memory of the set of welding guns is transmitted to the control and/or regulating device, it is ensured that the correct data sets will be used for regulating the welding current. The control and/or regulating device does not require any separate permanent data memories for the data sets associated with the welding guns. Therefore, it can readily be replaced by another control and/or regulating device of the same or similar design. In manufacturing equipment that uses several welding stations, each with its own control and/or regulating devices and welding current sources, the welding guns can be replaced and exchanged at will without having to network the digital computers of the different control and/or regulating devices with each other.

Any data sets can be stored in the local memory in the welding guns. In particular, the static control parameters (e.g., welding time, welding current strength, and electrode force), and the dynamic reference curves (e.g., welding current curve, electrode voltage drop curve, etc.) can be stored. In addition, more than one data set may be stored in the local storage memory. These data may be stored alternatively or jointly so that the welding guns can be connected to various different control and/or regulating devices and can supply the correct control and/or regulating data sets for each of these various control and/or regulating devices.

In addition, calibration data specific to the set of welding guns may be stored that contain the mechanical and/or electrical properties of the respective welding tongs used (e.g., force calibration). Also, the "stepper", which is the number of welds performed with the electrodes mounted on the welding tongs, together with the stepper function (the dimension of the welding current increase that depends on the number of welds) can be stored in a local memory. The stepper must be reset to zero when the welding electrodes are changed.

The present invention provides a significant advantage for the maintenance of the welding guns. At regular intervals (e.g., after a specific number of hours in use), the welding guns have to be checked in order to ensure proper mechanical function of the welding tongs and to ensure that the condition of electrically conducting components is acceptable. Whereas the stepper descrbed herein counts the number of welds performed with one set of electrodes, the local data storage memory may additionally record the number of welds and/or the time of service of the welding guns after the last check-up, and emit a signal (e.g., via the control computer) when maintenance service of the guns is necessary.

Another advantage of the present invention is that a manufacturer of welding guns can load the specific data sets for the welding guns into the local memory at the factory. This eliminates the need to perform reference welds or other adjustments on the part of the user, and a new pair of welding guns can be integrated into an existing welding system without losing any time. Thus, the welding guns of the invention comprising a local memory containing data relevant to their operation is advantageous both in systems with many exchangeable welding guns and also in systems utilizing one specific kind of replaceable welding guns.

The squeeze time, i.e., the time for moving the welding guns from the open to the closed position when applied to two metal sheets to be welded together, also may be memorialized in the local data storage memory. This is of major importance for programming the welding guns of welding robots. These robots should perform as many welds as possible within a certain period of time (e.g., a short cycle of work) in order to reduce the number of robots necessary for a given number of welds to be performed. Typically, the software program of a welding robot does not initiate the welding process before the end of the preprogrammed squeeze time to ensure that the welding guns are firmly shut and are squeezing the metal sheets before the electrodes are activated. Typically, the squeeze time is entered into the software program of the welding robot as a rough estimate, which is longer than the actual squeeze time of the welding tongs. If the correct value of the squeeze time is known to the producer of the welding tongs, and is memorialized within the local data storage memory, it can be communicated to the software program of the welding robot. The welding robot may then use the exact squeeze time rather than an estimate, thereby reducing the length of the work cycle, and increasing its efficiency.

The local memory used for data storage in the welding tongs of the present invention may comprise any appropriate type of memory storage. For example, if fixed data sets are to be stored, a ROM (read only memory) can be used. Preferably, an erasable permanent memory module (EEPROM or the like) is used as the local memory. However, a current-buffered RAM can also be used, buffered by a long-lived lithium battery. Data storage memories (RAM or ROM modules) are normally made in the form of chips with a plurality of contact pins and operated accordingly. In the present case, it is preferred to use data storage memories provided with only two terminals through which data are exchanged and, optionally, power can be supplied. Such data storage memories are known in the industry as "I-buttons" and are available from Dallas Semiconductor Corp., for example. Basically, any data storage memory can be used that is programmable and which stores the data put into it for a sufficiently long period of time.

In one embodiment, the local memory is connected with the control and/or regulating device of the welding device by means of data interfaces designed as parts of a plug connection, e.g., a male-type plug section and a corresponding female-type receiving section. When the welding tongs are connected to the welding device, connections must be provided for welding energy, cooling water, a power-generating lead, and a control lead. In most cases, the connection preferably includes a current-measuring device (e.g., a Rogowski coil), a voltage-measuring device, and an electrode travel and electrode force measuring device. It is readily possible to create another plug connection for the data interface for transmission of the locally stored control and/or regulating data of the welding tongs. Alternatively, the data may be transmitted from the local storage module on the welding tongs to the control and/or reference device via a remote or wireless connection. For example, a transponder system can be used, in which the data stored in the local data storage memory are transmitted by an integral antenna on the set of welding guns to a transceiver on the control and/or regulating device. The data exchange can also be performed using infrared signals. Basically, any method for data transmission from one data storage memory to another may be used in the present invention.

BRIEF DESCRIPTION OF THE FIGURE

The FIGURE is a schematic diagram of a resistance welding system incorporating a preferred embodiment of the welding tongs of the present invention.

DETAILED DESCRIPTION OF THE INVENTION

The advantages that result from the invention will be explained below with reference to the figure. As shown in the Figure, a welding system of the present invention comprises a control and/or regulating device 1 and a source for the welding current comprising a power controller 2 and a welding transformer 3. The welding guns 4 are connected to welding transformer 3, and the welding electrodes 5, 6 of the guns are pressed against the, sheets to be welded. The welding voltage is then picked up by measuring lead 7 that leads to the control and/or regulating device. The welding current is measured by a Rogowski coil 8 likewise connected by a measuring lead 9 with a control and/or regulating device. Additional measuring leads (electrode force and travel) are not shown for the sake of clarity. An EEPROM 10 is mounted on welding guns 4 and constitutes the local data storage for the control and/or regulating parameters, especially the reference values and reference curve patterns specific to welding guns 4. EEPROM 10 is connected with regulating and/or control device 1 by a data lead 11. For this purpose, a plug 12 is located at the end of cable 11, said plug being inserted into a socket 13 on the control and/or regulating device.

In operation, the set of welding guns 4 is attached to the device and the data interfaces of the welding guns and the control/regulating device are connected in order to effect transfer of the data stored in the local memory located on the set of guns to the memory of the control/regulating device. The device then can be operated as designed.

The welding system shown can be operated with any welding guns, since the parameters that change as a function of the welding guns are transmitted from the EEPROM on the welding guns in question to the control and/or regulating device. Operation of a manufacturing facility in which a plurality of different welding guns 4 is provided for connection to welding current source 2, 3 is readily possible.

Those skilled in the art will be able to ascertain many equivalents to the specific embodiments described herein. Such equivalents are intended to be encompassed within the scope of the following claims.

What is claimed is:

1. A resistance welding device, comprising:

a welding current source;

a welding current regulating device coupled to said welding current source;

at least one replaceable welding gun that receives current provided by said welding current source, wherein said welding gun comprises a local data storage memory that stores operating parameters specific for said welding gun; and a first data interface that transmits said operating parameters to said welding current regulating device.

2. The resistance welding device of claim 1, wherein said welding current regulating device comprises:

a second data interface that receives the operating parameters from said first data interface; and a program storage memory capable of receiving the data specific for the welding gun.

3. The resistance welding device of claim 2, wherein said first data interface includes a transceiver that transmits said operating parameters to a transceiver unit using wireless transmission, wherein said transceiver unit forms a portion of said second data interface.

4. The resistance welding device of claim 1, wherein said local data storage memory includes an erasable permanent storage module.

5. The resistance welding device of claim 4, wherein said erasable permanent storage module includes at least one of: an EEPROM and a buffered RAM module.

6. The resistance welding device of claim 1, wherein said first data interface includes an electrical plug electrically connectable to a complementary plug connection of said welding current regulating device.

7. Self-programming resistance welding gun, comprising:

a local data storage memory that stores resistance welding operating parameters specific for the welding gun; and a first data interface that transmits said operating parameters to a regulating device that controls operation of the welding gun.

8. The self-programming welding gun of claim 7 wherein said local data storage memory includes an erasable permanent storage module.

9. The self-programming welding gun of claim 8 wherein said erasable permanent storage module includes at least one of: an EEPROM and a buffered RAM module.

10. The self-programming welding gun of claim 7, wherein said data interface includes an electrical plug electrically connectable to a complementary plug connection of said regulating device.

11. The self-programming welding gun of claim 7, wherein said data interface includes a transceiver that transmits said stored operating parameters to a transceiver unit using wireless signal transmission, wherein said transceiver unit forms at least a portion of a data interface of the regulating device.

12. A method for operating a regulating device of a resistance welding system, comprising:

(a) attaching to the welding system a self-programming welding gun having a local data storage memory for storing operating parameters specific for the welding gun (b) monitoring current operating parameters during operation of the welding gun; and (c) transmitting the specific stored operating parameters to a regulating device that controls the operation of the welding gun.

13. A method, according to claim 12, wherein transmitting the specific operating parameters is performed using an electrical plug that connects the local data storage memory to the regulating device.

14. The method of claim 12, wherein transmitting includes using a transceiver that transmits the data to a transceiver unit using wireless signal transmission.

15. The method of claim 12, wherein the operating parameters comprise at least one of static control parameters and dynamic reference curves.

16. The method of claim 15, wherein the static control parameters comprise at least one parameters selected from the group of a number of welding operations performed with the welding gun, a welding time, a welding current, an electrode voltage drop and a squeeze time.

17. The method of claim 15, wherein the dynamic reference curves include a time dependence of the static control parameters to predict the operating parameters as a function of operating time.

18. A resistance welding system, comprising:

a self-programming welding gun;

regulating means, for regulating operation of said gun;

memory means, formed integrally with said gun, for storing operating parameters specific for said welding gun;

interface means, formed integrally with said gun, for transmitting the stored operating parameters to a regulating device that controls operation of said gun; and transmitting means, for transmitting the stored operating parameters to said regulating means.

19. A resistance welding device, comprising:

a controllable welding current source;

at least one replaceable welding gun that receives current provided by said controllable welding current source, wherein said welding gun comprises a local data storage memory that stores operating parameters specific for said welding gun; and a first data interface that transmits said operating parameters to said controllable welding current source, wherein at least a portion of the stored operating parameters can be updated based on an operating characteristics of the welding gun.

* * * * *